UNITED STATES PATENT OFFICE.

JOKICHI TAKAMINE, OF PEORIA, ILLINOIS.

PROCESS OF CONVERTING STARCHY MATERIAL INTO SUGAR.

SPECIFICATION forming part of Letters Patent No. 562,103, dated June 16, 1896.

Application filed November 21, 1894. Serial No. 529,488. (No specimens.)

*To all whom it may concern:*

Be it known that I, JOKICHI TAKAMINE, a subject of the Emperor of Japan, residing at Peoria, in the county of Peoria and State of Illinois, have invented a new and useful Improvement in Means for and Methods of Converting Starchy Material into Sugar, of which the following is a specification.

This invention relates to new and useful improvements in means for and method of converting starchy material into sugar, and it is designed as an improvement upon my prior patent, No. 525,971, granted September 11, 1894. In my said prior patent I have set forth and claimed a method of making a conversion of the starchy material of cereals, and also a converting agent in the form of a composition of matter, consisting in treating the material to be converted, after cooking the same, with a mixture or composition consisting of broken or comminuted grains of cereals from which the more starchy part has been removed, and taka-koji. In carrying out the process as set forth in said patent, to about ninety per cent. of the cooked mass to be converted is added a mixture composed of five per cent. of taka-koji, either in the dry form or in the form of an extract therefrom, and five per cent. of comminuted or broken grains of cereals from which the greater part of starchy matter has been removed, either in the dry form or in the form of a watery extract therefrom.

I have discovered that starch-containing substances, such as the grains of cereals, broken or unbroken, or comminuted, starch-containing tuber or root crops, such as potatoes, &c., corncobs, leguminous seeds, and, in fact, different and all parts of starch producing or containing plants or stalks, while in themselves possessing an inappreciable diastatic power or property, possess the property of acquiring a remarkably augmented, increased, or multiplied diastatic power or property when used in conjunction with taka-koji.

Heretofore, in the alcoholic industry, the materials constituting the mass for supplying the necessary starchy ingredient has been comminuted and then cooked at a temperature varying between 200° Fahrenheit and 300° Fahrenheit in order to thoroughly open the starch-cells thereof. The mass was then cooled down to about 150° Fahrenheit, and the converting agent added for the purpose of effecting a conversion of the mass into sugars. I have discovered that when the starch-containing substances constituting the mass to be converted has been subjected to the temperature necessary to thoroughly open the starch cells—namely, between 200° Fahrenheit and 300° Fahrenheit—the property above noted possessed by the constituents thereof is destroyed and wasted, and hence the beneficial use thereof has never been availed of.

In my present invention I remove from the mass of starch-containing material, before cooking the same, the constituents thereof possessing the property as above explained, and hence obtain and utilize as an ingredient of the converting agent for the mass a property possessed by the mass which is to be converted, and which property has heretofore been wasted and destroyed.

In carrying out my invention I first comminute the starch-containing material above specified in the ordinary way, and then treat the same to extract therefrom the substances possessing the peculiar property, as above mentioned, which, being soluble, is thereby dissolved out and may be utilized in admixture with taka-koji, as hereinafter more fully explained, to form the converting agent. This treatment does not injure the mass as the starch-supplying material to be converted, for the valuable feature of the mass as a mass to be converted is its starchy material, and starch is insoluble in the material employed in the extraction process, as will more fully hereinafter appear. After the extraction process the mass is cooked in the usual manner and at the usual temperature. It is then cooled down to about 150° Fahrenheit and the converting agent is added to effect a conversion thereof.

The extraction may be effected in any suitable way. The mass of starch-containing material may be soaked or steeped in water to effect the extraction, or water may be percolated through the mass in any suitably-arranged or convenient extraction or diffusion apparatus, the liquor obtained having a clear bright yellow color, depending somewhat upon the particular starch-containing substance employed. To this watery extract is added taka-koji, either in the dry form or, and preferably, in the form of taka-koji diastase or diastatic enzyme, in order to form the converting agent. If desired, the taka-koji in the dry form may be mixed with the mass of starch-containing substances and a watery extract obtained from the mixture before the cooking step, which extract will contain the peculiar substance of the mass, as above noted, and will constitute the converting agent, or the mass of starch-containing substances to be converted may be treated with a watery extract of taka-koji or with taka-koji diastase solution, in order to extract from said mass the peculiar substance thereof, and such extract used as the converting agent.

If desired, the whole unbroken grains of the cereals or tuber or root crops, leguminous seeds, starch or other starch-supplying substances may be employed and treated in the same manner as above described, though in the production of alcohol it is usual and preferable to first comminute the starchy substances. I do not confine myself therefore to comminuted or broken substances nor to any particular starch-containing substance or cereal.

It will be observed that the present invention differs from the invention set forth in my prior patent in that the peculiar substance employed as a constituent of the converting agent is obtained directly from the starch containing or supplying materials, whereas in my prior invention this substance was derived from that part of the grains or cereals from which the greater part of the starchy matter has been removed. Another and an important difference is that the constituent of the converting agent is obtained from the mass of starchy material which is to be converted, and this, too, without affecting the value of the mass as a starch-supplying substance, thus not only utilizing a substance heretofore lost and wasted, but also avoiding the expense of the raw comminuted or broken grains of cereals from which the greater part of starchy matter has been removed, as set forth in my prior patent.

In the practical application of my invention I have found that the ninety per cent. of starch-containing substances, comprising the mass to be converted, contains a sufficient or nearly sufficient amount of the peculiar substance referred to to entirely supplant the five per cent. of raw brans employed in my former patent in admixture with taka-koji in its several forms to form the converting agent. To the extract obtained from the ninety per cent. of starchy material to be converted I add, in order to form the converting agent, about five per cent. of taka-koji or the extract, or diastatic enzyme solution obtained from about five per cent of taka-koji, or the converting agent may be obtained by treating ninety per cent. of the mass to be converted with an extract from five per cent. of taka-koji, or with taka-koji diastase solution obtained from five per cent. of taka-koji, or a watery extract may be obtained from a mixture of ninety per cent. of the mass to be converted and five per cent. of dry taka-koji, and such extract employed to convert the mass after a subsequent cooking thereof.

In some cases I may for safety, and in order to supply any deficiency of the extract obtained from the mass to be converted, add about one per cent. of raw brans, or an extract from about one per cent. of the raw brans, in order to increase the diastatic or converting power of the converting agent to the required degree. In any case I effect a saving of at least four per cent., with reference to the mass to be converted, of the brans heretofore employed in this connection—that is to say, I effect a saving of at least about seventy-five per cent. of the total quantity of raw brans heretofore used in preparing the converting mixture, and also some saving of the quantity of taka-koji diastase. This is a remarkable result when it is considered that it effects a material reduction in the cost of conversion.

Having now fully explained and ascertained the nature of my invention and the method of its use, what I claim as new, and desire to secure by Letters Patent of the United States, is—

1. The method of converting starchy material into sugar, which consists, first, in obtaining a watery extract of the mass to be converted, then mixing with said extract taka-koji, then cooking the mass from which said extract is obtained, and, finally, adding to the cooked material the mixture; as and for the purpose set forth.

2. The method of converting starchy material into sugar, which consists in extracting the soluble matter contained in the mass to be converted, mixing with said extract taka-koji, then cooking the mass from which said extract has been made, then cooling it and finally adding the mixture; as and for the purpose set forth.

3. The method of converting starchy material into sugar, which consists in grinding the material to be converted to a meal, then treating with water to obtain an extract of the soluble matter thereof, adding to such extract taka-koji diastase, then cooking the mass from which said extract has been obtained, and, finally, adding thereto the mixture to effect a conversion thereof; as and for the purpose set forth.

4. The method of converting starchy material into sugar, which consists in treating the starchy material to be converted with taka-koji diastase, in order to extract the soluble matter contained therein, then cooking the material from which the extract has been obtained, and finally, returning thereto said extract as a converting agent; as and for the purpose set forth.

5. The method of converting starchy material into sugar, which consists in treating the mass to be converted with water to extract the soluble matter therefrom, then cooking the residue, then mixing said extract, taka-koji diastase and a watery extract from raw brans, and finally, adding such mixture to the cooked material; as and for the purpose set forth.

6. A composition of matter as a converting agent, comprising a mixture of the following ingredients: a watery extract from a mass of starch-containing material, a watery extract from taka-koji, and a watery extract from raw brans; as and for the purpose set forth.

7. The method of converting starchy material into sugar, which consists in extracting the mass to be converted, mixing the extract with taka-koji, cooking the extracted mass and then adding the mixture; as and for the purpose set forth.

8. The method of converting starchy material into sugar, which consists in mixing taka-koji and the mass to be converted, then extracting the mixed masses, and finally adding the extract to the extracted mass; as and for the purpose set forth.

In witness whereof I have hereunto set my hand this 16th day of November, 1894.

JOKICHI TAKAMINE.

In presence of—
WM. FIELDER,
H. J. FLORETH.